Jan. 30, 1962  W. E. THORNTON-TRUMP  3,018,905
MOBILE POWER-OPERATED BIN HANDLING AND TRANSPORTING VEHICLE
Filed March 23, 1959  3 Sheets-Sheet 1
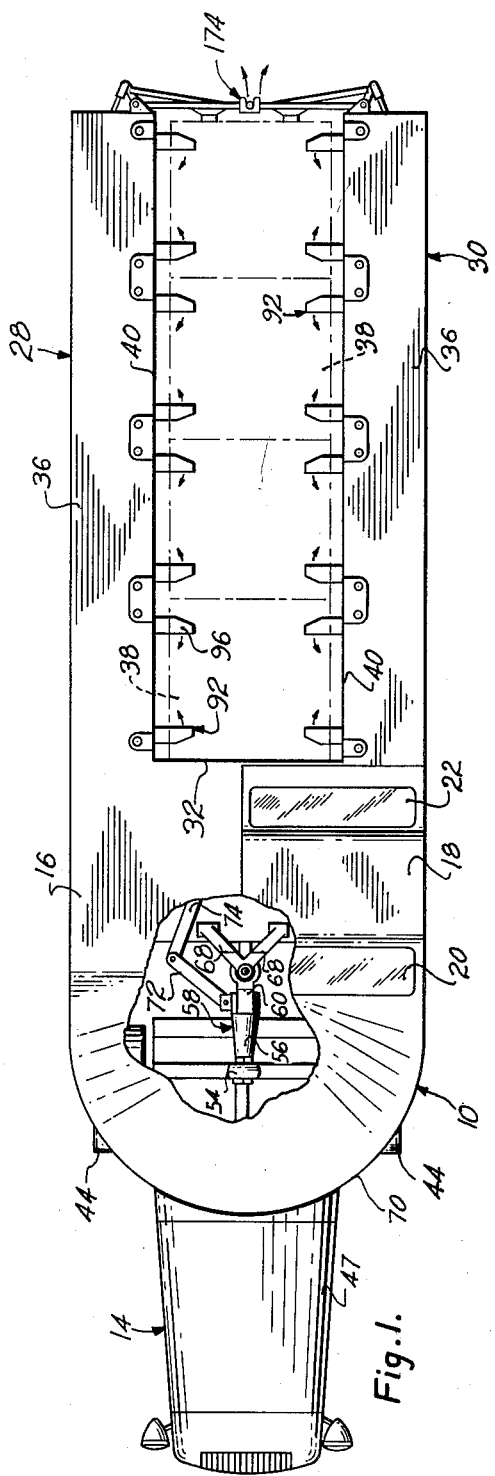
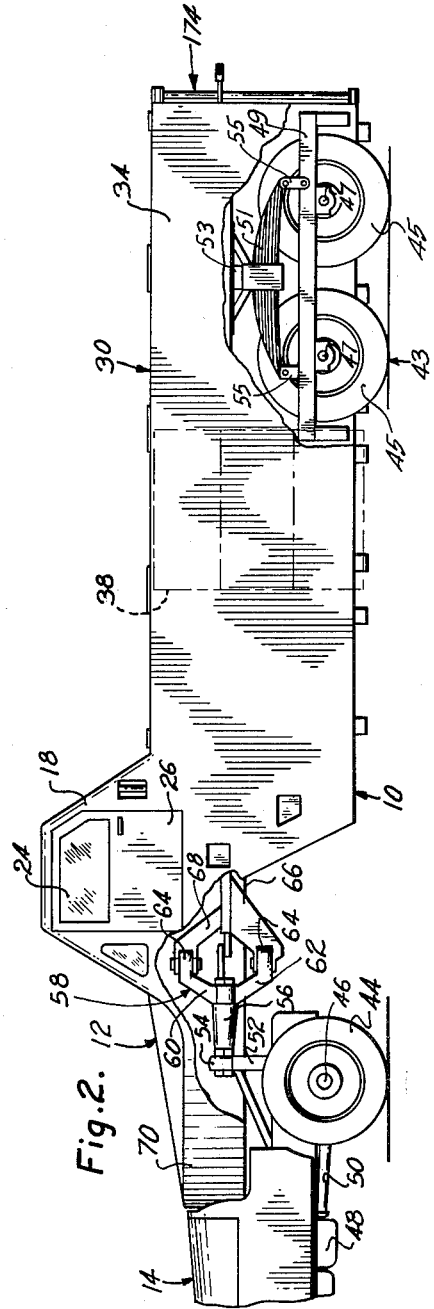
INVENTOR.
Walter E. Thornton-Trump
BY
ATTORNEY Jan. 30, 1962 W. E. THORNTON-TRUMP 3,018,905
MOBILE POWER-OPERATED BIN HANDLING AND TRANSPORTING VEHICLE
Filed March 23, 1959 3 Sheets-Sheet 2
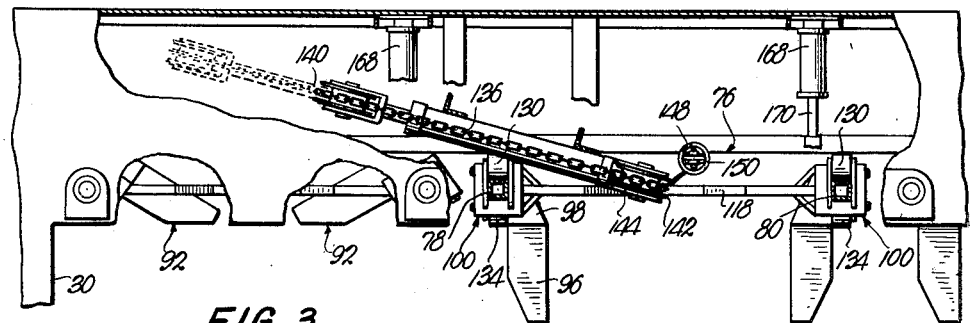
FIG. 3.
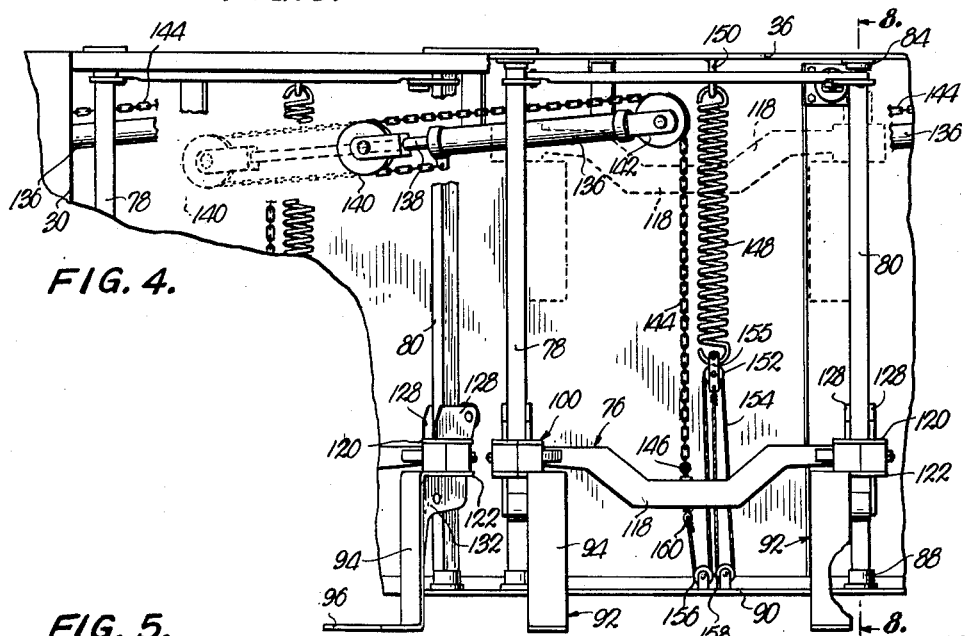
FIG. 4.
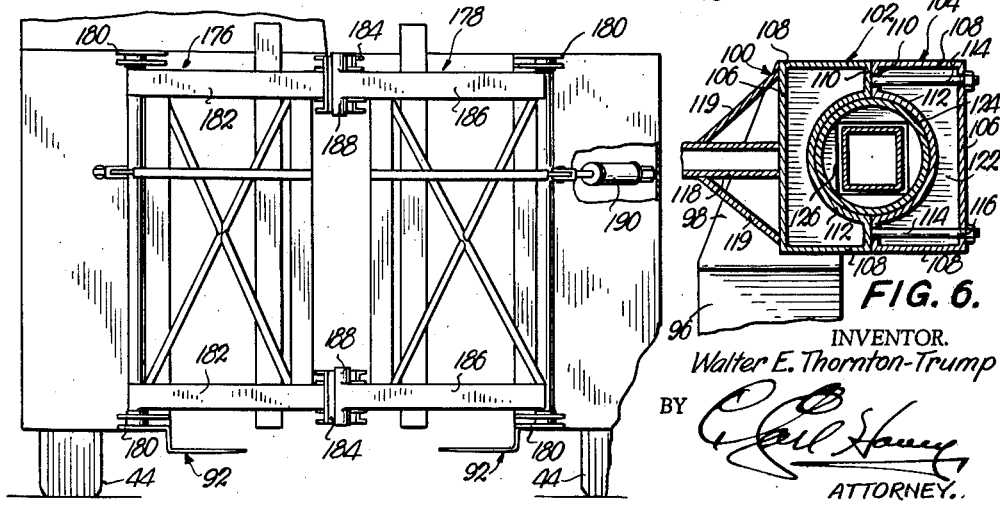
FIG. 5.
FIG. 6.
INVENTOR.
Walter E. Thornton-Trump
BY
ATTORNEY.

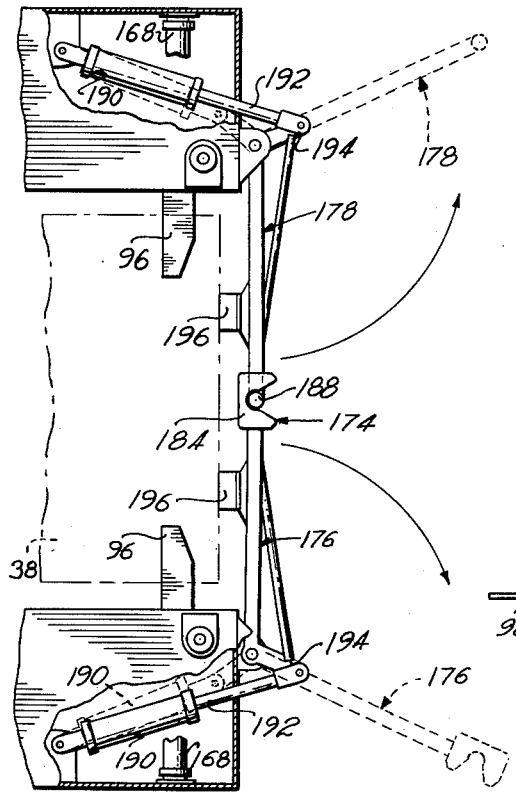
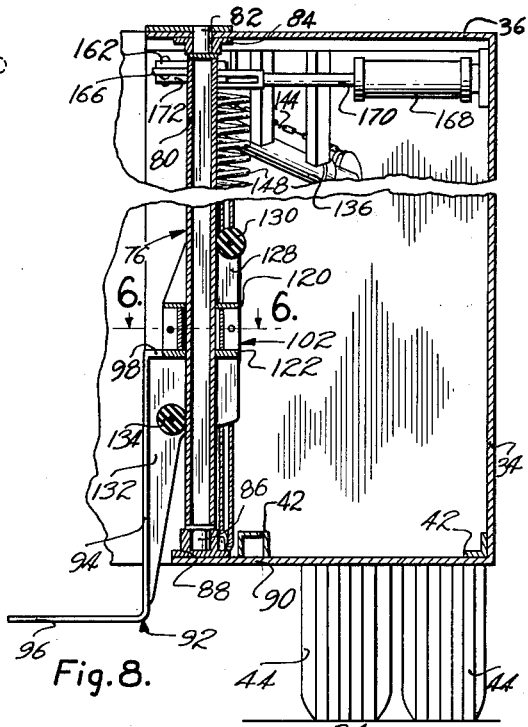
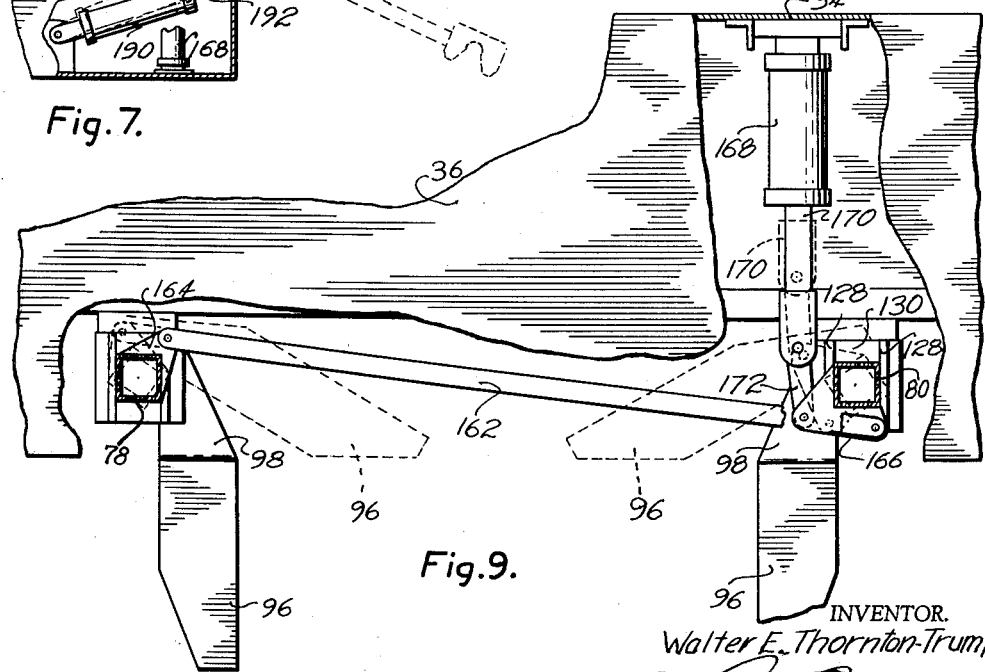
Fig. 7.
Fig. 8.
Fig. 9.

United States Patent Office 3,018,905
Patented Jan. 30, 1962

3,018,905
MOBILE POWER-OPERATED BIN HANDLING
AND TRANSPORTING VEHICLE
Walter E. Thornton-Trump, Box 160, Oliver,
British Columbia, Canada
Filed Mar. 23, 1959, Ser. No. 801,248
6 Claims. (Cl. 214—390)

This invention relates to material handling and moving equipment and more particularly, to a mobile power-operated vehicle adapted for handling and transporting orchard bins while the same are filled with fruit or the like.

In recent years, rapid changes have taken place in the handling of fruit from the orchard to the packing house with the conventional bushel baskets and boxes of relatively equivalent size being discarded for bulk fruit bins of approximately 4 ft. square and holding about 25 bushels, whereby the filled weight of such bins approximates 1000 lbs. These bins filled with fruit must be handled and transferred directly from the orchard to the packing plant and in order to accomplish such movement in an economical manner, it has heretofore been necessary for fruit growers and packing plants to have available various types of heavy duty fork lift trucks, as well as conventional tractor trailer units capable of carrying the loaded bins from the orchard to the plant.

Although most orchardists have small, relatively inexpensive, three point fork lifts attached to the rear of their tractors, these lifts are not adapted for lifting the heavily loaded bins to a sufficient elevation to be placed on the bed of a truck, although such small lifts are useful in moving the bins from the point where the same are loaded to a central pick-up area in the orchard. A heavy duty, high lifting fork lift necessary to put the bins on a truck bed is substantially prohibitive in cost and many orchard growers are not financially able to purchase equipment of this character. Furthermore, it is necessary for the packing plant to have a number of such high lift fork units available for unloading trucks as they arrive at the plant.

Another unsatisfactory method of handling relatively large, heavily loaded fruit bins has involved utilization of lumber carrier types of straddle trucks or straddle trailers, but these have not proven a success because of the relatively unwieldy nature of the same and the fact that such units cannot be advantageously utilized for transporting the bins from the orchards to the packing plant over conventional roads and highways. One of the principal disadvantages was the fact that the bins had to be stacked to a suitable height with a conventional high-loader and on a pair of parallel rails so that the angle iron clamps provided on the straddle truck could be moved under the load to lift the same as a unit when the straddle carrier was moved into a position receiving the stacked bins. This procedure was, of necessity, repeated at the packing plant wherein the bins were again lowered on rails provided for unloading operations. It can be appreciated that the utilization of rails for receiving the stacked bins was a disadvantage because if such rails were not secured to the ground, they were often knocked out of place and yet, if the same were placed in or joined to concrete or the like, they occupied far too much room and it was necessary for the straddle carrier to back along a very long aisle. Furthermore, the rails prevented the high-loader fork lift units from quickly and efficiently removing the stacked bins from their respective rails. Since the straddle truck can only haul a complete load, it was necessary to assemble a large quantity of loaded bins at a central area and then utilize expensive lifting equipment to properly stack the same on the described rails. From the foregoing, it can be perceived that this operation was not sufficiently efficient over the small basket type of handling process to make the handling operation attractive to many potential users thereof.

It is therefore, the most important object of the present invention to provide a mobile, power-operated vehicle capable of lifting one or more loaded bulk fruit bins to an elevated, transportable position where the same may be delivered directly to the packing plant without further handling of the same being necessary and without special equipment being required at the plant to unload the bins from the vehicle.

Another important object of the invention is to provide a mobile bin handling and transporting vehicle as described which includes mechanism for lifting the bins from the ground to transportable locations within the carrier, and maintaining such bins in their elevated, transportable positions as the vehicle is driven over conventional roads and highways to the packing plant, whereupon the bins are then lowered to the ground without the aid of expensive, lift truck equipment as has heretofore been necessary.

Also an important object of this invention is to provide a bulk bin handling and transporting vehicle which is adapted to pick up one or more bins from a number of locations until the vehicle is loaded, whereupon the same may be transported to the packing plant without additional handling of the same being required.

Other important objects of the invention relate to the provision of mobile power-operated bin handling and transporting vehicles of the type capable of being operated by a single man to thereby materially lower the labor costs of the operation; to a vehicle of the character referred to which is highly maneuverable and has a short turning radius and turning angle to right or left to permit the machine to be driven directly into the orchard between the trees to pick up loaded bulk orchard bins; to a carrier unit having unique controls permitting the operator to face either forwardly or rearwardly during steering of the vehicle to assure that the unit is traveling a correct path; to a bin handling and transporting vehicle having novel fork lifts mounted thereon for picking up bins directly from the ground and then raising the same to elevated, transportable positions within the carrier whereby conventional high lift trucks are unnecessary to load the bins; to a carrier having fork lifts as referred to which is adapted to transport a plurality of horizontally aligned bins and having separate controls for each of the lift forks engaging individual bins to permit selective raising or lowering of such bins; to a vehicle for handling and transporting bulk orchard bins which is constructed in a novel manner to permit the bins to be stacked two or more high to thereby increase the number of bins which may be transported in a single trip; to a carrier unit which may be operated very rapidly to thereby decrease the handling time of each bin and which vehicle may be driven over ordinary roads and highways at conventional speed, thereby decreasing the time elapsing between picking of the fruit and delivery of the same to the packing plant; and to other important objects and salient features of the instant invention which will become obvious or be explained more fully as the following specification progresses.

In the drawings:

FIGURE 1 is a plan view of a mobile power-operated bin handling and transporting vehicle as contemplated by the instant invention, with certain parts thereof being broken away to reveal the details of construction thereunder;

FIG. 2 is a fragmentary, side elevational view of the mobile vehicle illustrated in FIG. 1 and with certain portions of the side thereof broken away to show details of the interconnection between the self-propulsion unit and the bin carrier;

FIG. 3 is a fragmentary, enlarged view of a portion of one of the upright structures forming a part of the rear bin carrier and looking downwardly, with certain parts of the carrier being broken away and in section to reveal the construction within the upright structure;

FIG. 4 is a fragmentary, enlarged, side elevational view of the part of the carrier illustrated in FIG. 3 and likewise, having parts broken away to show the interior of the upright structure;

FIG. 5 is a fragmentary, rear elevational view of the instant mobile vehicle on a slightly larger scale than FIGS. 1 and 2 and showing the novel gate structure closing the end of the vehicle and interlocking opposed, upright structures forming a part of the carrier;

FIG. 6 is a fragmentary, enlarged, horizontal, cross-sectional view taken substantially on the line 6—6 of FIG. 8 and looking downwardly in the direction of the arrows;

FIG. 7 is a fragmentary, enlarged, plan view of the rear part of the bin carrier illustrating the way in which the gate is opened and with certain parts being broken away to show the structure for opening and closing the rear gate;

FIG. 8 is an enlarged, fragmentary, vertical, cross-sectional view taken on the line 8—8 of FIG. 4 and looking inwardly in the direction of the arrows; and FIG. 9 is a fragmentary, enlarged, plan view showing the novel linkage and hydraulically operated mechanism for swinging the fork lifts forming a part of the bin carrier, with parts of the structure being broken away to more clearly show the various components and their relative positions.

Briefly, the present invention comprises a mobile power-operated bin handling and transporting vehicle especially adapted for picking up a series of horizontally aligned, fully loaded fruit bins while the same are in the orchard and capable of lifting such bins to an elevated, transportable position within the main carrier unit of the vehicle, whereby the bins may be delivered to a packing plant or the like and then subsequently, lowered to the ground at a stipulated point without any additional equipment being necessary or with more than one vehicle operator. The bin carrier includes a pair of spaced structures adapted to receive a plurality of horizontally aligned bins therebetween while the same are disposed on the ground, as well as a series of power-operated lift forks carried by each of the structures and engageable with the underside of respective bins for lifting the latter to transportable, elevated locations within the carrier. The power-operated lift apparatus is adapted for stacking a number of the fully loaded bins two or more layers high, as desired, to thereby permit a maximum number of the bulk fruit bins to be transported at each trip made by the vehicle.

A mobile power-operated, bulk fruit bin handling and transporting vehicle is illustrated in its preferred form in the drawings and generally designated by the numeral 10. A carrier unit 12 constitutes the principal bulk bin handling section of vehicle 10, while a self-propulsion unit 14 is connected to carrier unit 12 for providing motive power to the same as well as the bin lifting mechanism carried by unit 12.

Carrier unit 12 includes a forward section 16 having a control cab 18 extending upwardly from section 16, whereby the operator of vehicle 10 within cab 18 has an unrestricted view in all directions by virtue of front and rear windows 20 and 22, as well as side panels 24, one of which is in access door 26. Although the details of the controls within cab 18 are not illustrated, it is contemplated that the same be conventional in character and the preferred control components will be outlined more fully hereinafter.

As best shown in FIG. 1, a pair of upright, substantially elongated structures 28 and 30 extend rearwardly from the transverse, internal vertical wall 32 of forward section 16. Each of the sections 28 and 30 has an outer, substantially imperforate, rectangular panel 34 connected to respective, inwardly extending, relatively narrow top walls 36 lying in a common plane with the top wall of section 16. As hereinabove pointed out, mobile vehicle 10 is adapted for handling and transporting a plurality of bulk fruit bins indicated by the numeral 38 and therefore, structures 28 and 30 are spaced apart a sufficient distance to receive a bin 38 therebetween and in particular, it is to be noted that the innermost opposed edges 40 of respective sections 28 and 30 are sufficiently spaced to clear bins 38 located therebetween.

Carrier unit 12 is provided with suitable framework including frame components 42 supporting structures 28 and 30 as well as forward section 16, and it is preferred that each of the structures 28 and 30 be mounted on wheel and axle assemblies 43 with the wheels of each assembly 43 preferably being positioned in tandem. As best shown in FIG. 2, tandem rear wheels 45 on respective sides of carrier unit 12, are rotatable on respective axles 47 in turn carried by horizontal walking beams 49 parallel with the longitudinal length of carrier unit 12. Inverted elliptical springs 51 suspended intermediate the ends thereof from corresponding brackets 53 on frame components 42, are connected at opposed ends thereof to respective walking beams 49 by shackles 55. The tandem springing arrangement minimizes jars and bumps to the fruit carried by the machine.

The forward end of section 16 is rotatably secured to self-propulsion unit 14 and as best shown in FIGS. 1 and 2, unit 14 includes a pair of dual wheels 44 joined to respective axles 46 which are in turn coupled with a drive axle (not shown) operated by a gasoline or diesel engine housed under forwardly extending hood 47 and operably connected to the drive axle through transmission means 48 and drive shaft 50. Wheel and axle units 44—46 are both driving and steering components, inasmuch as upright frame 52 carried by axles 46 has collar means 54 at the uppermost end thereof rotatably receiving one end of a member 56 for rotation on a horizontal axis. Member 56 serves as the base leg of a substantially Y-shaped frame 58 having angularly disposed, oppositely extending legs 60 and 62 normally lying in a substantially vertical plane. Substantially horizontally disposed bearing collars 64 integral with the outer ends of respective legs 60 and 62 are pivotally joined to a pair of outwardly diverging strut units 66 and 68 welded to the frame components 42 of carrier 12. As illustrated in FIG. 1, the forwardmost vertical edge 70 of section 16 is arcuate to permit self-propulsion unit 14 to swing about carrier unit 12 for steering of vehicle 10.

A steering link 72 pivotally connected to member 56 of Y-frame 58 and in turn pivotally joined to a link 74 controlled by the steering wheel mechanism provided within cab 18 permits vehicle 10 to be steered as frame 58 and thereby, axles 46, are swung about the common vertical axes of bearing collars 64 by linkage 72 and 74.

Each of the upright structures 28 and 30 has hydraulically operated lift means broadly designated 76. Although structures 28 and 30 may be of any desired length within practical limits, it is particularly contemplated that the same be of sufficient length to accommodate at least four fruit bins 38 in horizontal abutting relationship, as shown in FIG. 1. Thus, there is preferably provided lift means 76 on each of the structures 28 and 30 for each of the horizontally aligned bins 38.

In order to simplify the description of carrier unit 12 and in particular, the individual power-operated lift means 76, only one of the lift mechanisms will be described in detail, but it is to be understood that the designated components are duplicated with respect to each of the lift means 76 on respective structures 28 and 30. Thus, there is provided a pair of uprights or standards 78 and 80 which are preferably tubular in nature and square in transverse cross-section. Cylindrical elements 82 rigidly secured to the uppermost ends of each of the standards 78 and 80 and rotatably received within suitable bearings 84 mounted on upper walls 36 of structures 28 and 30, as well as cylindrical elements 86 rigidly connected to the lowermost ends of corresponding standards 78 and 80 and rotatably carried by cup-shaped bearings 88 mounted on the bottom, horizontally disposed walls 90 of respective sections 28 and 30, permit standards 78 and 80 to rotate about respective vertical axes.

Each of the lift mechanisms 76 has a pair of fork lifts broadly designated 92 which are substantially Z-shaped in configuration and thereby have upright segments 94 and normally horizontal, laterally extending arm segments 96 integral with the lowermost ends of respective upright segments 94. Mounting segments 98 integral with the uppermost ends of each upright segment 94 and extending laterally therefrom in a direction opposite to arm segments 96, in turn form a part of individual collars broadly designated 100 mounting fork lifts 92 on respective pairs of standards 78 and 80.

Each collar 100 comprises a pair of substantially identical, intermediate sections 102 and 104, each section having an outer vertical wall 106 and a pair of opposed, laterally extending, vertical side walls 108 extending toward each other from opposed end walls 106 in a manner so that the margins thereof remote from respective end walls 106 are normally disposed in abutting relationship. Inwardly extending, inner walls 110 integral with the outer margins of corresponding side walls 108 are in turn secured to the longitudinal straight edges of semicyclindrical segments 112, with the convex surfaces of corresponding segments 112 facing toward the innermost faces of respective end walls 106 of both of the sections 102 and 104. Means for interconnecting sections 102 and 104 may comprise a pair of elongated bolts 114 which are joined to the outer faces of the inner walls 110 of section 102 and extend through suitable perforations in the inner walls 110 and end wall 106 of section 104. Nuts 116 complementally threaded on the outermost ends of bolts 114 extending outwardly from the outer exposed face of end wall 106 of section 104 serve to rigidly secure sections 102 and 104 in interengagement with semicyclindrical segments 112 presenting a cylindrical space between end walls 106 and side walls 108 of corresponding sections 102 and 104.

An elongated cross member 118 spans the distance between collars 100 on standards 78 and 80 and is suitably joined as by welding or the like to opposed outer faces of end walls 106 of opposed sections 102 of collars 100. Gussets 119 connected to respective sections 102 and a corresponding end of cross member 118 reinforce the joint between cross member 118 and collar 100, as is clear from FIG. 6.

A pair of polygonal, flat plates 120 and 122 overlie and underlie respectively sections 102 and 104 of each collar 100 and, as clearly illustrated in FIG. 8, mounting segment 98 of each lift fork 92 is integral and lies within the plane of a respective plate 122 underlying sections 102 and 104. A cylinder 124 rotatably positioned within the cylindrical space defined by segments 112 is rigidly connected to opposed inner faces of plates 120 and 122 and, as indicated in FIG. 6, the outer surface of cylinder 124 rotatably engages the inner surfaces of respective segments 112 to the end that the latter guide cylinder 124 while permitting the same to rotate relative to sections 102 and 104. Plates 120 and 122 have aligned, rectangular openings 126 therein clearing respective standards 78 or 80 to thereby permit collars 100 to reciprocate vertically on standards 78 and 80.

A pair of upstanding brackets 128 welded to the upper face of respective plates 120 on opposed sides of corresponding standards 78 and 80 and preferably on those surfaces of standards 78 and 80 parallel with vertical planes through arm segments 96 of lift forks 92, mount a horizontally rotatable, resilient roller 130 in engagement with a respective face of corresponding standards 78 and 80. Similarly, horizontally spaced bracket plates 132 joined to the outer margins of upright segments 94 and mounting segments 98 of lift forks 92 and in parallelism with brackets 128, carry a horizontally rotatable, resilient roller 134 normally engaging the face of a standard 78 or 80 opposite to that engaged by roller 130. It is to be pointed out that when rollers 130 and 134 are in engagement with standards 78 and 80, respective upright segments 94 of lift forks 92 are in a substantially vertical position.

Power-operated means for raising and lowering cross member 118 and thereby lift forks 92 by virtue of collars 100, includes a hydraulic cylinder 136 connected to suitable hydraulic lines and disposed in a substantially horizontal position adjacent upper wall 36 of structures 28 and 30. Piston rod 138 connected to a piston within cylinder 136 and reciprocable with respect to the latter has a pulley 140 rotatably mounted on the outermost end thereof away from cylinder 136, while a second sheave 142 is rotatably secured to the end of cylinder 136 remote from pulley 140. An elongated chain 144 is secured to cylinder 136 at the end thereof adjacent pulley 140 and then passes over the latter and sheave 142 and is attached to cross member 118 intermediate collars 100 by suitable fastening means 146.

Mechanism for biasing cross member 118 toward the lowermost end of its path of travel comprises a relatively strong coil spring 148 connected at its uppermost end to a hook 150 secured to the lower face of a respective upper wall 36 of structures 28 and 30, and having a rotatable sheave 152 hooked over and depending from the lower end thereof. An elongated cable 154 secured to the block 155 mounting sheave 152 passes over the latter as well as a pair of closely spaced pulleys 156 and 158 rotatably joined to the lower wall 90 of structures 28 and 30 and is connected at its opposite end to the cross member 118 in direct opposition to fastening means 146 by a hook 160.

Power-operated mechanism for rotating upright standards 78 and 80 in opposite directions comprises an elongated link 162 spanning the distance between standards 78 and 80 and pivotally connected at one end thereof to flat lug 164 welded to standard 78 adjacent the uppermost end thereof and extending laterally from the same, while the opposite end of link 162 is pivotally connected to another flat lug 166 joined to standard 80 in a plane substantially parallel with lug 164 and also projecting laterally from standard 80 in a direction opposite to lug 164. A hydraulic cylinder 168 mounted on upright panel 34 of a corresponding structure 28 and 30 is substantially parallel with a horizontal plane through link 162 and is connected to suitable supply lines of hydraulic fluid under pressure. Piston rod 170, connected to a piston within a cylinder 168 and reciprocable with respect to the latter is pivotally connected to the underface of lug 166 in spaced relationship to the point of pivotal interconnection between link 162 and lug 166, by a short link 172. Thus, as piston rod 170 is retracted into cylinder 168, link 172 rotates lug 166 to in turn rotate lug 164 through link 162, thereby causing standards 78 and 80 to be rotated on their longitudinal axes in opposite directions.

In order to assure that fruit bins 38 are maintained within carrier 12 in proper positions during movement of vehicle 10, gate structure broadly designated by the numeral 174 is provided at the rear end of carrier unit 12. Gate structure 174 includes a pair of gates 176 and 178 pivotally mounted on respective hinges 180 for rotation on spaced, vertical axes. The normally horizontal cross members 182 of gate 176 have substantially U-shaped lock elements 184 mounted on the normally outermost ends of cross members 182 and disposed with the slot portion thereof facing outwardly when gate 176 is closed, while normally horizontal cross members 186 have transversely extending lock bars 188 secured to the outermost ends of respective cross members 186 in positions to engage within U-shaped lock elements 184 when both of the gates 176 and 178 are closed. The interlocking engagement between lock elements 184 and lock bars 188 is best shown in FIG. 7 of the drawings.

Hydraulic cylinders 190 pivotally mounted at respective ends thereof on corresponding structures 28 and 30 extending rearwardly toward gate structure 174 each have reciprocable piston rods 192 pivotally joined to crank arms 194 connected to gates 176 and 178 in a manner so that upon reciprocation of piston rods 192 with respect to cylinders 190, gates 176 and 178 are swung about the vertical axes of hinges 180 to and from closed positions.

As set forth above, lift means 76 is provided on each of the structures 28 and 30 for each bin 38 which may be carried by carrier unit 12 in horizontal alignment, and it is to be pointed out that suitable control mechanism is disposed within cab 18 permitting the operator of vehicle 10 to selectively actuate separate lift mechanisms 76. Furthermore, it is preferred that separate, individually controllable steering means be provided within cab 18 on opposite sides of the driver's seat to permit the operator to steer vehicle 10 while either facing forwardly or rearwardly. To facilitate this type of control, the driver's seat should be pivotally mounted within cab 18 to permit the same to swing in a 360° arc. It is to be understood that the operator's view is unimpeded because of the provision of windows 20 and 22, allowing the driver substantially unrestricted vision in either direction.

In operation, it is initially pointed out that vehicle 10 is driven directly into the orchard where the bulk fruit bins 38 may be lifted directly from the ground for transportation to the processing plant. As the operator directs vehicle 10 into the orchard, he normally faces the front and steers with the forward steering wheel. The engine operably coupled with wheel shafts 46 through the drive axle connected therewith provides motive power for wheels 44 to propel vehicle 10 in any desired direction. It can be seen that axles 46 may swing about a horizontal axis defined by member 56 of Y-frame 58 to compensate for irregularities encountered in the ground over which vehicle 10 is driven. By the same token, vehicle 10 may be steered by turning the steering wheel to move steering link 72 and link 74 to swing Y-frame 58 about a vertical axis defined by bearing collars 64 rotatably mounted on struts 66 and 68 connected to the frame components 43 of carrier unit 12. Thus, as self-propulsion unit 14 turns with respect to carrier 12, the direction of the same is changed.

When the operator reaches the area where the bins 38 are positioned on the ground in horizontal alignment and substantially in abuttting relationship, the driver moves vehicle 10 into a position with carrier unit 12 adapted to receive bins 38 between structures 28 and 30. It can be seen that backing of vehicle 10 to a position where bins 38 may be received in the rear opening therein is facilitated by virtue of the fact that the operator may swing 180° on his seat within cab 18 to the rear steering wheel and where he may view bins 38 and their alignment with structures 28 and 30 through window 22.

With structures 28 and 30 of carrier unit 12 substantially aligned with the row of bulk fruit bins 38 in a position to receive such bins between structures 28 and 30, the operator actuates controls to direct hydraulic fluid into cylinders 190 which in turn retracts piston rods 192 into respective cylinders 190, thereby swinging gates 176 and 178 outwardly about their hinges 180 as cranks 194 are swung toward structures 28 and 30 by piston rods 192. The open positions of gates 176 and 178 are indicated by dotted lines in FIG. 7 wherein it can be seen that the operator may now back carrier unit 12 into a position with structures 28 and 30 receiving four of the bulk fruit bins 38 therebetween.

It is to be understood that prior to backing of carrier unit 12 over the bins 38, controls within cab 18 have been suitably actuated to cause all of the fork lifts 92 to be rotated into folded positions against respective structures 28 and 30, whereby such fork lifts 92 clear bins 38 as carrier unit 12 is backed over the same.

When all of the bins 38 are in correct alignment between structures 28 and 30, controls within cab 18 are actuated to cause fork lifts 92 to initially be moved to the lowermost end of their path of travel. This is accomplished by opening valve means controlling flow of hydraulic fluid into and out of cylinders 136, to permit the fluid to pass out of cylinders 136 whereby coil springs 148 acting on cables 154 force respective cross members 118 downwardly, to thereby carry collars 100 and fork lifts 92 mounted thereon downwardly with the same. As cross members 118 and collars 100 move downwardly with respect to standards 78 and 80, rollers 130 and 134 roll on opposed faces of standards 78 and 80 and openings 126 in plates 120 and 122 clear standards 78 and 80.

After fork lifts 92 are at the lowermost end of their path of travel, additional control means in cab 18 is actuated to rotate arm segments 96 of each fork lift 92 into positions beneath the underside of respective bins 38. This rotational movement of work lifts 92 is accomplished by virtue of hydraulic fluid being forced into cylinders 168 to thereby cause the piston rods 170 reciprocably mounted in the same to be extended, which in turn rotates lugs 166 and 164 and standards 78 and 80 by virtue of short links 172 interconnecting piston rods 170 and lugs 166, as well as links 172 coupled to lug 166 and lug 164 respectively. As standards 78 are rotated in a counter-clockwise direction and standards 80 in a clockwise direction viewing FIG. 9, plates 120 and 122 are rotated therewith by virtue of engagement of brackets 128 and bracket plates 132 with respective standards 78 and 80, as well as rollers 130 and 134 disposed against opposed faces of such standards. It can be perceived that through provision of cylinders 124 interconnecting plates 120 and 122, as each plate 120 is rotated, plates 122 are pivoted therewith to swing fork lifts 92 to their positions with arm segments 96 extending into the space between structures 28 and 30 and which in this instance would be beneath the undersides of respective fruit bins 38. Although not specifically illustrated, it is to be understood that bins 38 have transversely extending spacer blocks secured to the bottoms thereof at opposed ends of the bins to maintain the bottoms of the bins out of engagement with the ground or the bin therebeneath and thus presenting spaces for receiving fork lifts 92.

Next, the operator actuates control means within cab 18 to direct fluid under pressure into hydraulic cylinders 136 which causes respective piston rods 138 to be extended, and moving rotatable pulleys 140 therewith. As pulleys 140 are shifted to their outer positions as indicated in dotted lines in FIG. 4, chains 144 roll on pulleys 140 and sheave 142 to thereby lift cross members 118 with respect to corresponding standards 78 and 80. As cross member 118 of each lift mechanism 76 is raised, lift forks 92 joined to respective collars 100 are raised therewith to in turn elevate bulk fruit bins 38 to locations within carrier 12 sufficient to clear another series of bins 38 disposed on the ground in horizontal, aligned positions. It is to be emphasized at this point that the first series of bins 38 need only be raised sufficiently high to clear the next set of bins.

When the first series of bins 38 have reached the required elevation, the operator deactivates the controls directing hydraulic fluid into cylinders 136 and again backs vehicle 10 into a position with structures 28 and 30 receiving another series of four bins 38 therebetween and immediately below the first series of bins 38 maintained within carrier unit 12 at an elevated location. Upon actuation of mechanism permitting the hydraulic fluid to flow from cylinders 136, the weight of bins 38 on respective fork lifts 92 forces cross members 118 downwardly until arm segments 96 engage the uppermost margins of the second series of bins 38. Thereupon, the driver causes hydraulic fluid to be forced into cylinders 168 in a direction to retract piston rods 170 thereinto, whereupon fork lifts 92 are swung to their bin-clearing positions against corresponding structures 28 and 30 by linkage 172 and 162. The folded positions of lift forks 92 are clearly illustrated in FIG. 9. As such lift forks 92 move into their folded positions, the first series of bins 38 are permitted to rest on the second series of bins 38 which are still supported on the ground.

The operator then causes fork lifts 92 mounted on cross members 118 to be moved to the lowermost end of their path of travel in the manner described above, whereupon the arm segments 96 may again be rotated into positions engaging the undersides of the second series of bins 38. The procedure of raising the two series of bins 38 to elevated positions within carrier unit 12 is repeated, whereupon a third set of bins 38 may be picked up and lifted to transportable locations within vehicle 10 in the manner as set forth above.

The twelve bins 38 within carrier unit 12 are now disposed so that the same may be delivered to the processing plant without further handling being necessary. In order to assure that bins 38 remain in predetermined positions within the space between structures 28 and 30, the operator causes hydraulic fluid to be directed into cylinders 190 in a direction to force piston rods 192 into extended positions as shown in full lines in FIG. 7, whereupon gates 176 and 178 are closed with lock bars 188 engaging within U-shaped lock elements 184 to tie the rear extremities of structures 28 and 30 together during movement of vehicle 10. In this connection it is to be noted that bumper pads 196 mounted on the inner faces of gates 176 and 178 engage the rearmost bins 38 to prevent movement of bins 38 with respect to structures 28 and 30.

Upon delivery of bins 38 to the processing plant or other desired point, the entire load may be lowered into a desired area and the lift forks 92 rotated to positions against structure 28, whereby upon opening of gates 176 and 178, the vehicle 10 may be driven away from the bins without any individual handling of the same being necessary.

It is now apparent that a power-operated bin handling and transporting vehicle has been provided which is adapted for picking up one or more bins from the assembly area in the orchard and then capable of delivering the bins to the packing plant over conventional highways at ordinary road speeds. This very materially lessens the cost of handling the fruit and permits the same to be transported to the processing plant in the shortest period of time.

Having thus described the invention what is claimed as new and desired to be secured by Letters Patent is:

1. A mobile bin handling and transporting vehicle comprising a wheel supported carrier including a forward section and a pair of spaced, elongated, upright structures extending rearwardly from said sections, the rear end of said carrier defined by the rear margins of said structures being open and said structures being spaced a sufficient distance to receive a bin therebetween while the latter is on the ground and as the carrier is backed over the same; power-operated means carried by each of the structures and engageable with said bin for lifting the latter to a transportable, elevated position within the carrier; and gate means mounted on said rear end of the carrier for closing said opening defined by the rear margins of the structure and adapted to maintain said bin within the carrier during transportation of the same, said gate means including an assembly swingably mounted on each of said rear margins of the structures for rotation on vertical axes, the normally outermost extremities of said assemblies overlapping and interlocking when said gate means is closed to assure retention of said bin in the carrier.

2. A mobile bin handling and transporting vehicle comprising a wheel supported carrier including a forward section and a pair of spaced, elongated, upright structures extending rearwardly from said sections, the rear end of said carrier defined by the rear margins of said structures being open and said structures being spaced a sufficient distance to receive a bin therebetween while the latter is on the ground and as the carrier is backed over the same; and power-operated means on each of the structures and including a pair of forks engageable with the underside of said bin for lifting the latter to a transportable, elevated position within the carrier, said forks being rotatable to and from positions engaging said underside of the bin, each of said forks including an upright member and an arm integral therewith at the lower end of said member and extending laterally therefrom in a substantially horizontal plane, said power means including an upright for each of said forks, a collar carrying each of the forks and slidably mounted on a respective upright and a cross member interconnecting said collars whereby both of said forks are raised and lowered simultaneously.

3. A vehicle as set forth in claim 2 wherein is provided mechanism operably coupled to each pair of said forks for simultaneously rotating the latter to and from said positions engaging said underside of the bin.

4. A vehicle as set forth in claim 2 wherein is provided resilient means connected to said cross member for biasing the latter and thereby said forks toward the lower end of their path of travel and hydraulically operated means coupled with said cross members for moving the latter and thereby said forks to the upper end of their path of travel.

5. A vehicle as set forth in claim 2 wherein is provided means carried by each of said collars and engaging a respective upright for rotating corresponding forks in response to rotation of said uprights about their longitudinal axes.

6. A vehicle as set forth in claim 5 wherein is provided crank mechanism connected to the uprights of each of said pair of forks for simultaneously rotating said uprights and thereby the forks thereon and hydraulically operated means coupled with said crank mechanism for actuating the same.

References Cited in the file of this patent

UNITED STATES PATENTS

| | | |
|---|---|---|
| 1,757,798 | Grab | May 6, 1930 |
| 1,973,030 | Webber | Sept. 11, 1934 |
| 2,400,218 | Akers | May 14, 1946 |
| 2,410,965 | Dimick | Nov. 12, 1946 |
| 2,480,392 | Alves | Aug. 30, 1949 |
| 2,512,333 | Jaffa et al. | June 20, 1950 |
| 2,583,075 | Anderson et al. | Jan. 22, 1952 |
| 2,625,372 | Yerian | Jan. 13, 1953 |
| 2,690,269 | Bill | Sept. 28, 1954 |